US008725657B2

(12) United States Patent
Jarman et al.

(10) Patent No.: US 8,725,657 B2
(45) Date of Patent: May 13, 2014

(54) UTILITY METERING SYSTEM INCORPORATING A TRANSACTION AUTHORISATION SYSTEM

(75) Inventors: Michael Jarman, London (GB); Gavin Howard, Hassocks (GB)

(73) Assignee: Secure Electrans Limited (GB)

( * ) Notice: Subject to any disclaimer, the term of this patent is extended or adjusted under 35 U.S.C. 154(b) by 1189 days.

(21) Appl. No.: 09/862,917

(22) Filed: May 22, 2001

(65) Prior Publication Data

US 2003/0167178 A1    Sep. 4, 2003

Related U.S. Application Data

(60) Provisional application No. 60/210,997, filed on Jun. 12, 2000.

(30) Foreign Application Priority Data

May 22, 2000   (GB) .................................. 0012392.7

(51) Int. Cl.
*G06F 17/00*   (2006.01)
*G06Q 40/00*   (2012.01)

(52) U.S. Cl.
USPC ................ 705/412; 705/44; 705/39

(58) Field of Classification Search
USPC .......... 705/40, 63, 400, 412, 413, 26, 39, 42, 705/44; 700/291, 286, 295, 287; 702/60, 702/61, 62, 179, 180; 709/217, 218, 219, 709/223; 340/870.02, 870.03; 235/380, 235/379; 379/106.03
See application file for complete search history.

(56) References Cited

U.S. PATENT DOCUMENTS

| | | | | |
|---|---|---|---|---|
| 4,351,028 A | * | 9/1982 | Peddie et al. ................. | 700/286 |
| 4,731,575 A | * | 3/1988 | Sloan ........................... | 235/381 |
| 4,777,354 A | | 10/1988 | Thomas | |
| 4,862,501 A | * | 8/1989 | Kamitake et al. ............ | 713/172 |
| 5,146,067 A | * | 9/1992 | Sloan et al. .................... | 235/381 |
| 5,699,276 A | * | 12/1997 | Roos ............................. | 705/412 |
| 5,956,462 A | * | 9/1999 | Langford ...................... | 392/449 |
| 5,959,549 A | | 9/1999 | Synesiou et al. ......... | 340/870.02 |
| 5,995,022 A | * | 11/1999 | Plis et al. ................. | 340/870.02 |

(Continued)

FOREIGN PATENT DOCUMENTS

| | | |
|---|---|---|
| AU | 4135293 A | 12/1993 |
| EP | 0015120 | 9/1980 |

(Continued)

OTHER PUBLICATIONS

English translation of the Abstract attached.

*Primary Examiner* — Igor Borissov
(74) *Attorney, Agent, or Firm* — Craig A. Fieschko, Esq.; DeWitt Ross & Stevens S.C.

(57) ABSTRACT

A transaction authorization system comprises a user interface unit 30 capable of accepting a transaction authorization and a utility meter 10 provided at a location having an associated location identifier unique to the location, wherein the utility meter 10 is arranged to communicate with the user interface unit 10, to obtain a transaction authorization, and to transmit an authorization request based on the transaction authorization and location identifier to obtain authorization of the transaction.

34 Claims, 7 Drawing Sheets

(56) References Cited

U.S. PATENT DOCUMENTS

| | | | | |
|---|---|---|---|---|
| 6,021,402 | A * | 2/2000 | Takriti | 705/412 |
| 6,039,247 | A | 3/2000 | Reccia et al. | 235/379 |
| 6,282,522 | B1 * | 8/2001 | Davis et al. | 705/41 |
| 6,476,728 | B1 * | 11/2002 | Sakakibara | 340/870.02 |
| 6,529,883 | B1 * | 3/2003 | Yee et al. | 705/63 |
| 6,553,353 | B1 * | 4/2003 | Littlejohn | 705/412 |

FOREIGN PATENT DOCUMENTS

| | | | |
|---|---|---|---|
| EP | 0863492 A1 | | 9/1998 |
| GB | 2179215 | * | 2/1987 |
| GB | 2309086 A | | 7/1997 |
| GB | 2312069 A | * | 10/1997 |
| WO | WO 00/58922 | | 10/2000 |
| WO | WO 0115099 | | 3/2001 |

\* cited by examiner

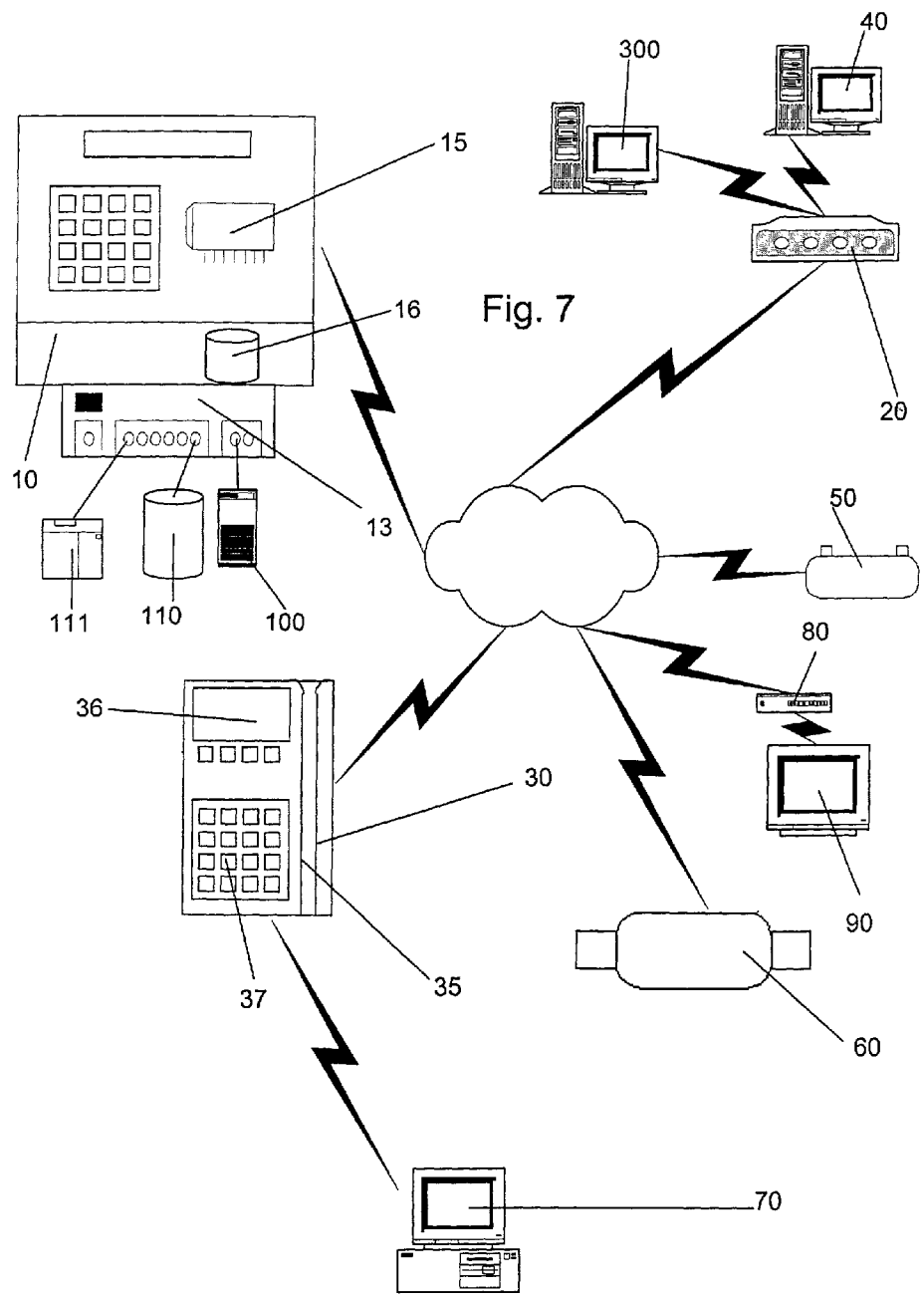

UTILITY METERING SYSTEM INCORPORATING A TRANSACTION AUTHORISATION SYSTEM

CROSS-REFERENCE TO RELATED APPLICATION

This application claims the benefit of the U.S. Provisional Application No. 60/210,997 filed Jun. 12, 2000.

FIELD OF THE INVENTION

The present invention relates to a utility metering system, which incorporates a transaction authorization system for secure authorization of transactions and, in particular financial transactions.

BACKGROUND TO THE INVENTION

Fraud is increasing dramatically for "card not present" financial card transactions such as credit card, debit card and charge card transactions. In such transactions, business is typically effected remotely, e.g. by Telephone or Internet Shopping. The purchaser discloses his or her name, credit card number and expiry date in order for the credit card to be charged for a product or service.

These sorts of transactions are different to "card present" transactions at Electronic Point-of-Sale Terminals or the like, where both the cardholder (purchaser) and the card are required to be physically present. The purchaser is required to sign an authorization to permit a transaction to be charged against that card's account. The merchant is accountable for the verification and authentication of the card and the validation of the cardholder's identity.

By the fact that:
 1. A recognisable card is presented
 2. Identification, Authorisation and Entitlement processes are enforced
 3. The location of the transaction is legitimate Then the transaction qualifies as a "card present" transaction.

Typically in "card not present" transactions it is not possible to verify the identity of the purchaser and the validity of the "card". Anybody knowing the information contents of a valid credit card can make purchases and charge that card account with "card not present" transactions. The purchaser need not even have the card. Another a common fraudulent practice is to acquire discarded credit card receipts, which contain the necessary account information, to create fraudulent "card not present" transactions. In order to avoid this, some merchants will only deliver to the address registered with the customer's credit card issuer (usually a Financial Institution). More recently, computer programs have been developed and made available on the Internet that successfully generate random credit card numbers.

One particular area where the use of credit cards is increasing exponentially is on the World Wide Web in e-commerce E-Tailer websites and the like. Whilst credit and debit cards are currently the only feasible ways for such sites to be paid for their products or services, the lack of security of transactions across the Internet, even if encrypted, has resulted in many financial problems and privacy concerns. Because transactions can be intercepted or monitored, unscrupulous persons are obtaining credit card numbers and fraudulently using them for other purchases. The level of security of websites varies considerably and many sites have found themselves being attacked for the contents of their databases containing credit card details.

In response to the potential and actual problems, the international bodies responsible for credit cards, including VISA and MasterCard, have introduced premium charges associated with "card not present" transactions. As these premiums are not normally charged on "card present" transactions, the vendor, who is competing with traditional vendors using point-of-sale "card present" transactions, has to bear a substantial overhead; this reduces his profit margin in order to remain competitive. The main reason that the international card issuing bodies claim that the premiums are justified is that a consumer can claim against a credit card issuer if the order is not properly fulfilled. Equally, where there is a dispute over a "card not present" transaction, such as the validity of the amount charged, authenticity of the transaction or proven receipt of goods the rules favour the consumer against the merchant. The merchant is accountable for all costs for transactions in dispute. In addition, in order to cover themselves against losses and overheads from dealing with these fraudulent transactions the card issuers add a premium to the merchant discount rate, as a form of insurance.

STATEMENT OF INVENTION

According to one aspect of the present invention, there is provided a transaction authorization system comprising a user interface unit capable of accepting a transaction authorization and a utility meter provided at a location having an associated location identifier unique to the location, wherein the utility meter is arranged to communicate with the user interface unit, to obtain a transaction authorization, and to securely transmit the transaction authorization and location identifier as a transaction authorization request for authorization of the transaction.

Utility meters must be fixed at, or very close to, the location to be metered because they need to measure the supply of the utility as it enters the location. Taking advantage of the fact that an installed meter is virtually immoveable, that the meter has an embedded unique and secure identifier that identifier satisfies criterion 3 (the location of the transaction is known) and meets "card present" requirements. The user interface unit enables the user (the purchaser) to confirm their identity and to prove that the card is present by inputting a legitimate transaction authorization (such as by entering the card in a card reader and providing an authorization code), therefore satisfying criteria 1 and 2. The resultant transaction authorization request can be securely communicated to the financial institutions for fulfillment and settlement as a legitimate "card present" transaction.

Preferably, the transaction authorization system includes a communication unit, which communicates with an authorization authority, wherein the utility meter is arranged to submit the authorization request to the communication unit for transmission to the authorization authority. Preferably, the utility meter is arranged to submit utility usage data to the communication unit.

Further utility meters may be provided at the location, wherein said further utility meters may be arranged to submit utility usage data to the communication unit. The further utility meters may be arranged to submit the utility usage data to said utility meter for submission to the communication unit.

The further meters may include gas and water meters. Preferably, the utility meter is an electricity meter.

The communication unit may be arranged to communicate utility usage data to a utility supplier. The communication may be direct or may be via a central control system. The authorization authority may comprise a central control system, wherein the central control system is configured to process communicated authorization requests and to submit the requests to appropriate banking authorities for fulfillment.

The communication unit may be a modem.

The user interface unit and the utility meter may communicate with each other via RF signals. The communication unit and the utility meter may communicate with each other via RF signals. The further utility meters may communicate via RF signals.

The user interface unit may include a card reader device, wherein the card reader device is arranged to read data from a card to be charged for the transaction, the user interface unit being responsive to process the data from the card to form at least a part of a transaction authorization. The user interface unit may include a keypad, wherein the user interface unit is arranged to accept a code entered via the keypad to form at least a part of a transaction authorization.

The utility meter may include a memory for securely storing a user's bank account data, wherein the user interface unit is arranged to accept an input from the user authorising use of at least part of the banking data to form at least a part of a transaction authorization.

The user interface unit may include a display, wherein the user interface unit is arranged to display on request utility usage data from the utility meter.

The user interface unit may be connectable to a computer, wherein the user interface unit, when connected to a computer, is operative to make necessary transaction authorization requests in response to electronic transactions initiated on the computer.

Preferably the transaction is a financial transaction. Preferably the user interface device is remote from the utility meter. Most preferably the user interface unit is a hand held device.

The system may comprise a digital cellular transceiver arranged to communicate with the utility meter for transmitting data to, and receiving data, from a remote source. The transceiver may be the communication unit. The system may further comprise a switching unit controllable by the energy supplier for switching appliances on and off, wherein when the utility meter receives a signal via the transceiver indicating the availability of cheap-rate energy it is arranged to control the switching unit, or send equivalent signals to a locally associated unit.

According to another aspect of the present invention, there is provided a method of making a transaction using the transaction authorization system described above, the method comprising the steps of requesting goods or services for which payment is required and entering a transaction authorization via a user interface unit, wherein the transaction authorization is communicated by the utility meter to effect payment for the transaction either on-line or off-line.

According to another aspect of the present invention, there is provided an energy supply system including a utility meter, a switching unit controllable by the utility meter provided at a location for switching appliances on and off and a communication unit, the utility meter having an associated location identifier unique to the location, the utility meter being arranged to communicate with a remote system via the communication unit, the remote system having a database of the unique identifiers, wherein upon determination or prediction of an energy surplus or shortage the remote system is arranged to select appropriate locations to switch appliances on or off to meet the surplus or shortage, for each selected location the remote system determining the location's unique identifier from the database and communicating control data for the location's switching unit to the location's utility meter via the location's communication unit using the location's unique identifier.

According to a further aspect of the present invention, there is provided pre-payment energy supply system including a pre-payment utility meter, and a communication unit provided at a location, the utility meter having an associated location identifier unique to the location and a memory for storing pre-payment credits, the utility meter being arranged to communicate with a remote system via the communication unit, the remote system having a database of the unique identifiers, wherein a payment for crediting to a meter includes the unique identifier, the remote communication unit being responsive to a payment to initiate communication with the communication unit of the location using the unique identifier and to add appropriate pre-payment credits to the memory.

Each communication unit may include data such as telephone or transponder numbers, passwords and the like for use in initiating communication with the communication unit, the data being stored in the database and being linked to the unique identifier for the location of the communication unit, wherein the remote system uses the unique identifier to obtain the data to initiate communication with the communication unit.

According to a further aspect of the present invention, there is provided a method of controlling the provision of energy to users having a pre-payment energy supply meter and a communication unit provided at a location, the utility meter having an associated location identifier unique to the location and a memory for storing pre-payment credits, the method comprising the steps of communicating with the utility meter via the communication unit and writing pre-payment credits to the memory.

By being able to selectively communicate with utility meters, surplus energy generated during off-peak periods can be utilised by energy storage devices such as off-peak heaters. Furthermore, the control of pre-payment credits to a meter can be maintained without the use of electronic keys and the like. This can be used for income support schemes and the like to arrange direct crediting of meters without the occupant being involved in the transaction.

Where the memory in a pre-payment meter reaches or falls below a predetermined level, the utility meter may be arranged to communicate with a predetermined authority to obtain emergency credits. Such emergency credits may be based, for example, against prior payment records and reputation, an authorization from the energy supplier, issue of extra credits by a government body or a loan against the next payment of credits to the meter.

BRIEF DESCRIPTION OF THE DRAWINGS

Examples of the present invention will now be described in detail, with reference to the accompanying drawings in which.

DETAILED DESCRIPTION

Figure 1:
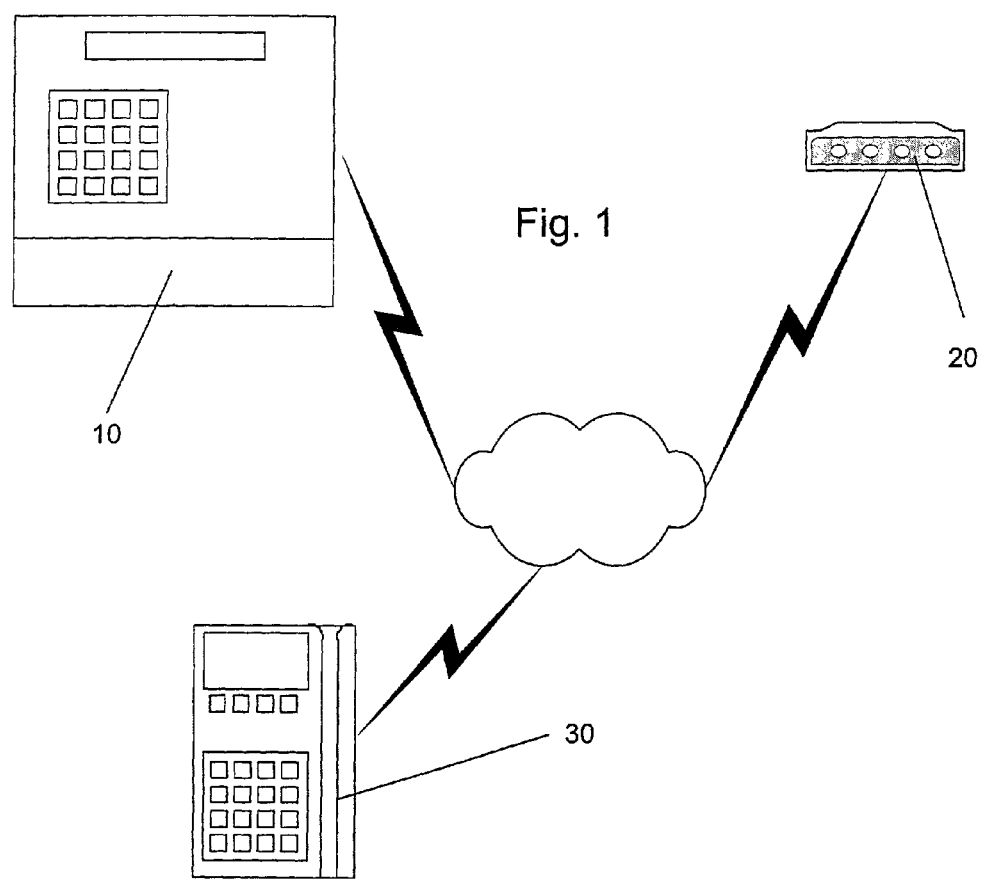
FIG. 1 is a schematic diagram of a system according to one aspect of the present invention.

FIG. 1 is a schematic diagram of a system according to one aspect of the present invention. A utility metering system includes a utility meter 10 provided at a location to be metered. The utility meter 10 is coupled to the utility supply and is arranged to provide the features and functions of a standard utility meter including a utility usage display. Preferably, the utility meter 10 is an electricity meter. A communication unit 20 is also provided at the location and is able to accept utility usage data from the utility meter and communicate the utility usage data to a utility supplier. A user interface unit 30 communicates with the utility meter 10 and is able to enter and display utility information upon request. This may include utility payments to a utility company from a deposit account or consumption, tariff, time, power interruption and payments history information. If the meter is configured to be a pre-pay meter, the credit balance and emergency credit information may also be displayed.

Figure 2:
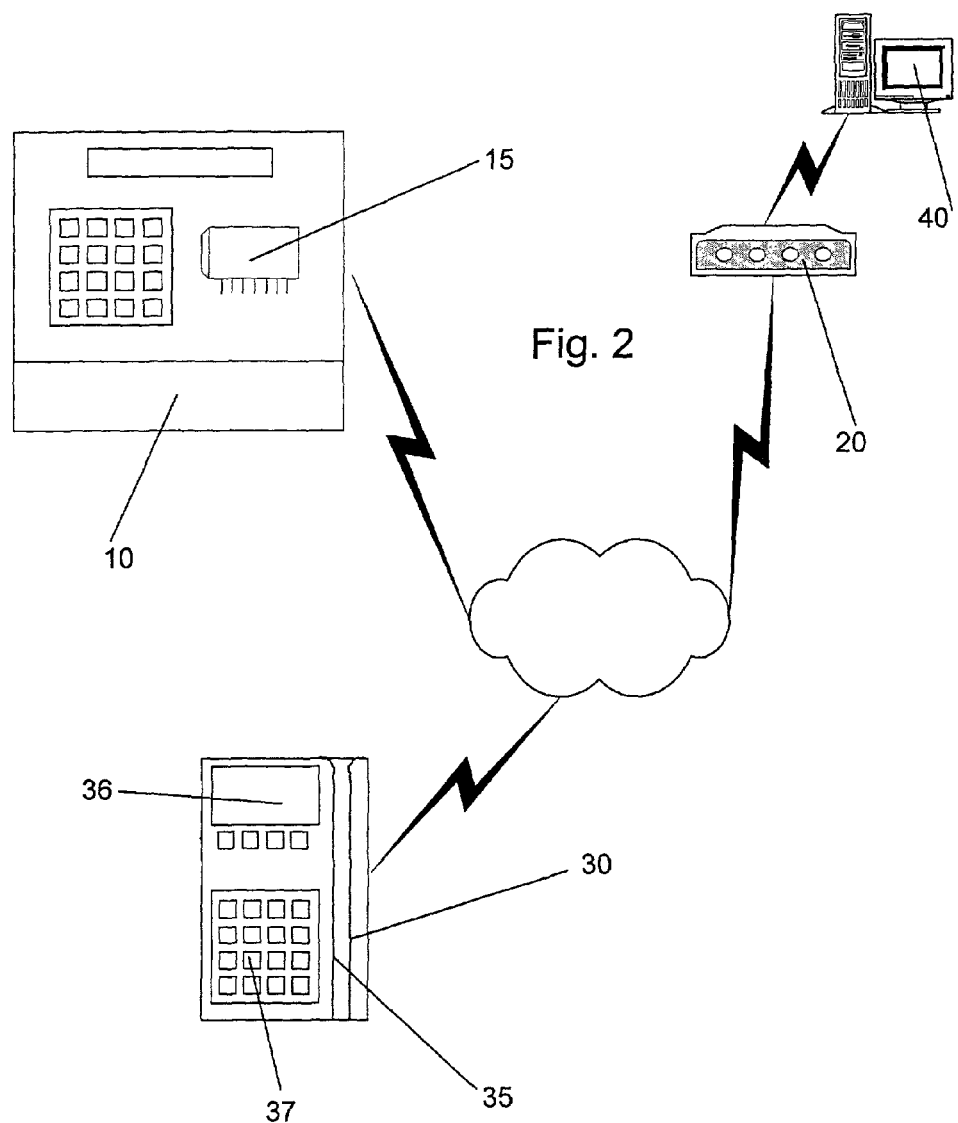
FIG. 2 is the schematic diagram of the system of FIG. 1 including features according to a one aspect of the present invention.

FIG. 2 is the schematic diagram of the system of FIG. 1 including features according to a preferred aspect of the present invention. The utility meter 10 has an identification code unique to the location embedded within it. The utility meter also includes a transaction processing system 15. The user interface unit 30 includes a card reader device 35, display 36 and keypad 37.

A user starts a transaction for goods or services, for example over the Internet or by telephone. Upon making an order or requesting a service, the user is provided with a transaction code and is requested to arrange payment. At the location, the user enters the transaction code into the user interface unit 30 via the keypad 37. The user interface unit 30 may contact a remote system (not shown) to obtain data on the transaction in dependence on the transaction code. The user is then requested via prompts on the display 36 to provide details of a payment account to be charged by making a transaction authorization to thereby authorise payment of the transaction. The user inserts a credit or debit card into the card reader device 35, which obtains the necessary card details including card number and expiry date. The user then enters an authorization code associated with the card via the keypad 37. The user interface unit 30 communicates with the utility meter 10 and passes the transaction code and card data to the utility meter 10. These are combined at the utility meter 10 with the identification code to form an authorization request. Preferably, parts or all of authorization request are encrypted at the utility meter 10 and/or at the user interface unit 30. The transaction processing system 15 of the utility meter 10 establishes communication with the communication unit 20 and controls the communication unit 20 to establish communication with an authorization authority 40. The encrypted authorization request is then communicated via the communication unit 20 to the authorization authority 40 which processes the authorization request as a "card present" type transaction and arranges payment of the transaction on the user's card account. An authorization response message indicating success or failure of the authorization request is returned to the user interface unit. This message may contain an authorization code to be passed on to the product/service provider to indicate fulfillment of payment. Utility usage bills may also be paid in this way, the user authorising payment via the user interface unit 30. The system may be programmed such that utility bills are automatically paid via a predetermined credit card or payment deposit account without user intervention after the initial set-up. In the case of pre-payment utility meters, credit may be purchased via the user interface unit 30 in the manner described above.

Figure 3:
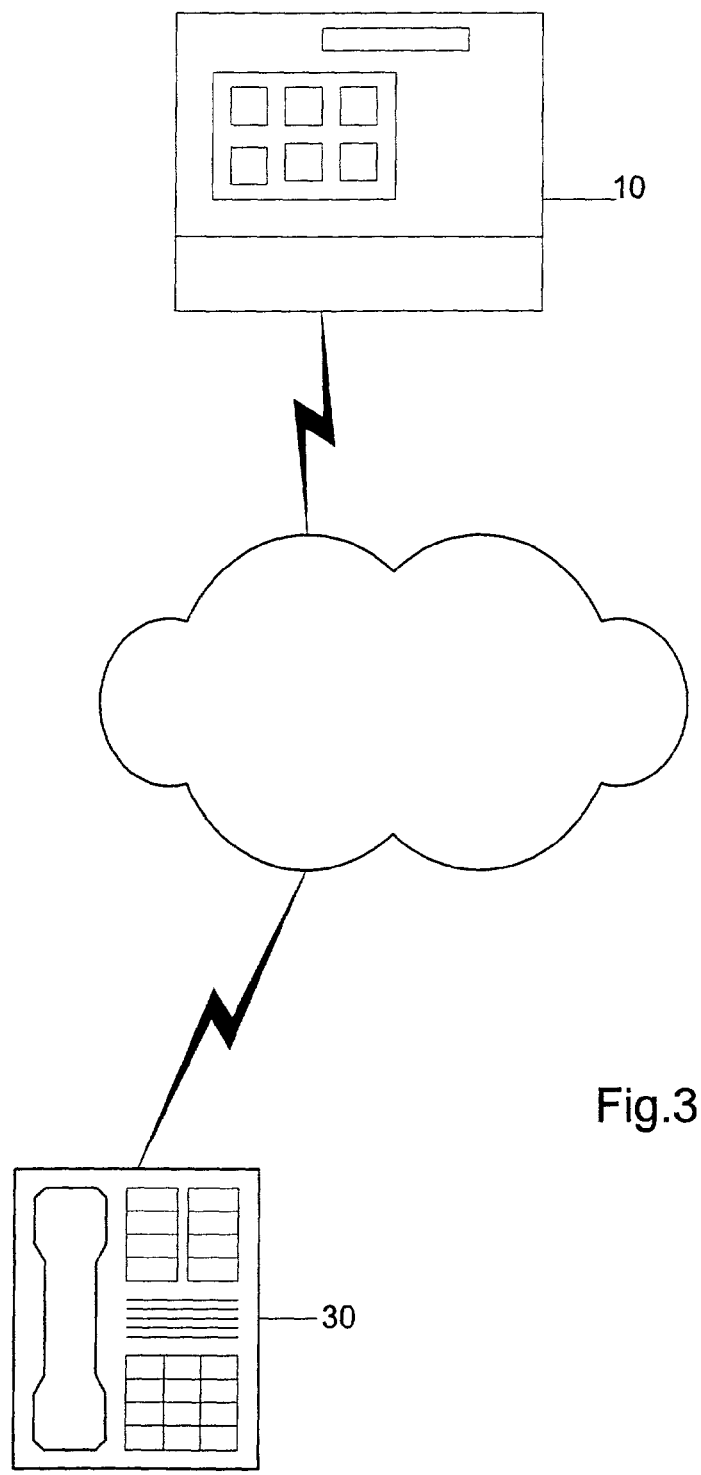
FIG. 3 is a schematic diagram of a system according to a preferred aspect of the present invention.

FIG. 3 is a schematic diagram of a system according to a preferred aspect of the present invention. In this configuration, the communication unit and user interface unit are integrated into a single device 30. Preferably the device also functions as a standard telephone and would therefore be connected to the PSTN. The telephone may be a standard wired telephone, a digital cordless telephone (such as a DECT telephone), a cellular radio telephone or some other form of telephone capable of making and receiving communications. Preferably the device 30 includes a display screen for displaying telephony, utility meter and transaction data. The device may include memory and one or more processors for running computer software for applications such as placing bets, purchasing lottery tickets, least cost routing for long distance phone calls and the like. The software is preferably downloadable into the device 30 over the PSTN (not shown).

Whilst the following description and accompanying Figures refer back to the system configuration of FIGS. 1 and 2, it will be apparent that the additional features could equally be applied to the configuration of FIG. 3 in which the user interface unit 30 and communication unit 20 are combined.

Figure 4:
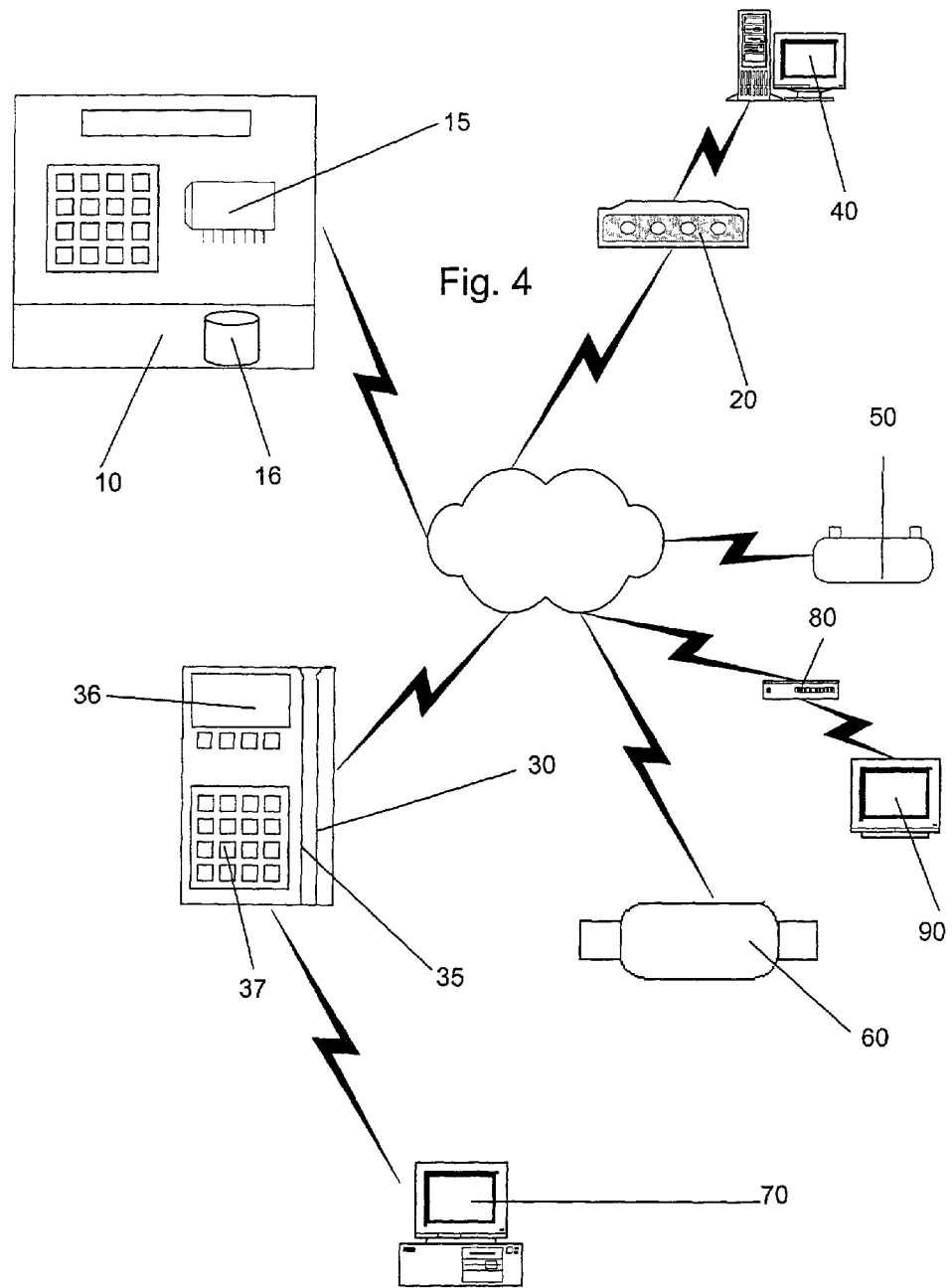
FIG. 4 is the schematic diagram of the system of FIG. 2 illustrating a number of additional aspects of the present invention.

FIG. 4 is the schematic diagram of FIG. 2 illustrating a number of additional aspects of the present invention. Further utility meters 50 and 60 are provided at the location and are adapted to communicate further utility usage data to the utility meter 10. Preferably the further utility meters 50, 60 are for gas and water respectively. The utility meter 10 is configured to communicate the further utility usage data to the appropriate utility supplier via the communication unit 20. The user interface unit 30 is configured to communicate with the further utility meters 50, 60 and to display utility usage and charging information upon request.

Instead of, or in addition to, the card reader device 35, the utility meter 10 may be provided with a memory device 16 in which a user's bank account data is stored. In place of providing a card to be charged for a transaction, the user may authorise the utility meter to release some of the banking data for the purpose of charging. The user's computer 70 may also be adapted or arranged to communicate with the user interface unit 30 via a serial port connection, USB, infra red, BlueTooth or the like. Communication between the computer 70 and user interface unit 30 allows the transaction data for an online transaction to be automatically communicated to the user interface unit 30 without the user's intervention. Furthermore, utility usage data, transaction data and the like could be communicated from the utility meter 10 to the computer 70 via the user interface unit 30 for storage or analysis.

A set-top box 80 connected to a television 90 may also be provided at the location. The set-top box 80 may operate in a similar manner to the computer 70, communicating with the user interface unit 30 for authorization of transactions made via the set-top box. Additionally, the set-top box 80 may allow the whole system to be managed, for data to be added and updated and for transactions reviewed via communication with and/or control from the user interface unit 30. Furthermore, it is possible that the set-top box 80, television 90 and television remote control (not shown) can act in place of the user interface unit 30. If necessary, a card reader could be provided in the remote control or the smart card reader commonly included in set-top boxes could be utilised.

It is preferred that each utility meter (10, 50, 60), the user interface unit 30 and the communication unit 20 each include an RF communication device, thereby forming a localised Pico-network. Communication is via secure, low power radio transmissions. If RF communication is not feasible, cables or other connection mechanisms may be used. The communication unit 20 is likely to be a modem transparently connected to the PSTN between the user's telephone and telephone socket. Obviously, the communication unit could operate via ISDN and could be integrated into the utility meter subject to a telephone socket being close to the meter. Further communication mechanisms such as GSM or cable connection are equally feasible and other mechanisms could be employed as and when they become available without any technical difficulty.

The utility meter 10 is preferably configured to be able to alert the authorization authority 40 or some other predetermined online services provider via the communication unit 20 if the operation of the Pico-network fails or if one of the system components fails completely or fails to pass a predetermined test. In particular, gas and water meters may be configured to issue an alert upon detection of a leak. The utility meter is preferably configured to communicate with the authorization authority 40 to inform it of power failures and interruptions in service. Fault and service failure information could be used to determine whether the equipment has been tampered with and whether further investigation is necessary. Where tampering is suspected authorization requests containing the meter's identification code would no longer be allowed.

In order to reduce communication between utility meters and the authorization authority, the utility meter 10 may be arranged to retrieve and communicate utility usage data on a regularly scheduled but variable interval (such as monthly) basis at a predetermined time. The data may be verified, aggregated and then delivered to the appropriate energy supplier or the like. Whilst connected, the utility meter may download new data and/or parameter changes such as new tariffs, a new dial-in time or marketing messages. Additionally, new software for the meter 10 or user interface unit 30 may be automatically downloaded.

Each user may be given an authorization code to access the user interface unit 30. The personal access code may serve to allow the user to his or her own data stored in the system and only to use cards and data associated with him or her. Optionally, a "super user" may be nominated for the location having the authority to restrict others from access or certain types of transactions, authorise new personal access codes and generally monitor the system. A number of user interface units 30 may be used in the location at once. Where other utility meters are adapted to forward utility usage information to utility meter 10, these are preferably arranged to communicate this information at least every 24 hours. Communication between the user interface unit 30 and the utility meter 10 and the communication unit 20 occurs as and when necessary.

Whilst the processing and composition of an authorization request is performed at the utility meter 10 in the above described embodiment, it is equally possible that the identification code is obtained from the utility meter 10 by the user interface unit 30, combined with the card data, transaction code and authorization code, encrypted and then communicated to the utility meter 10. At the utility meter 10, any necessary data packeting and the like are performed prior to transmission. Encryption algorithms such as DES, RSA or any other available mechanism may be used.

Figure 5:
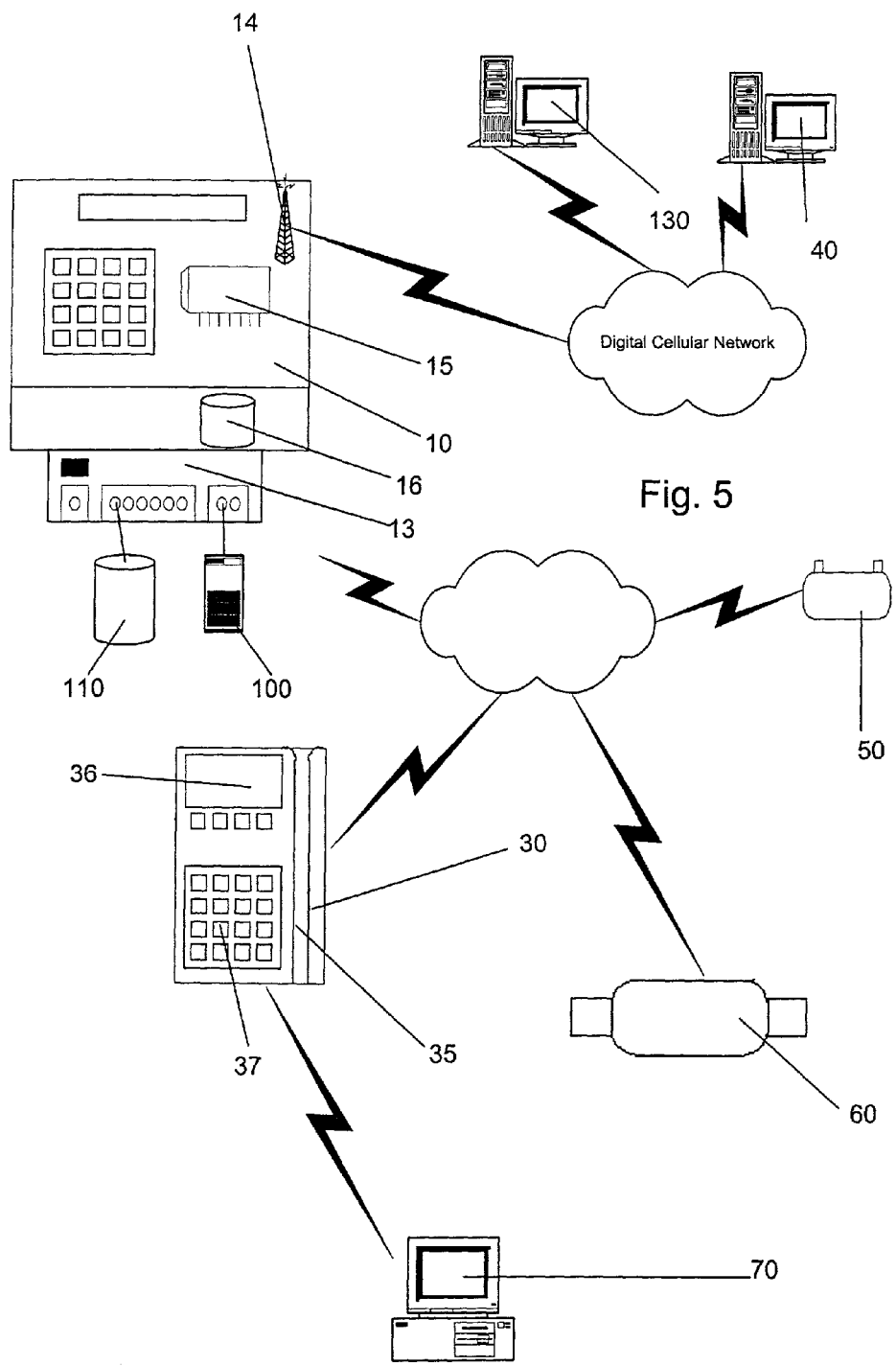
FIG. 5 is a schematic diagram of a system according to another aspect of the present invention.

FIG. 5 is a schematic diagram of a system according to another aspect of the present invention. The utility meter 10 includes a number of controllable switches 13 and a transceiver 14. The switches 13 are connected to appliances that are capable of storing energy for later use. In particular, these may include electric storage heaters 100 and hot water storage systems 110. The transceiver 14 is configured to be able to send and receive data via a digital cellular network 120.

The utility meter operates substantially as has been described with reference to the previous Figures with the exception that communication is via the transceiver 14 instead of a communication unit 20.

During low electrical power consumption periods, an electricity supplier 130 can selectively call the transceivers 14 using the digital cellular network 120 and offer reduced-rate electrical power. The utility meter 10 is able to determine, via the switches 13, whether there are appliances (100, 110) with capacity for accepting the power. If so, the utility meter communicates acceptance to the electricity supplier 130 and switches on the appliances (100, 110) via the switches 13.

Figure 6:
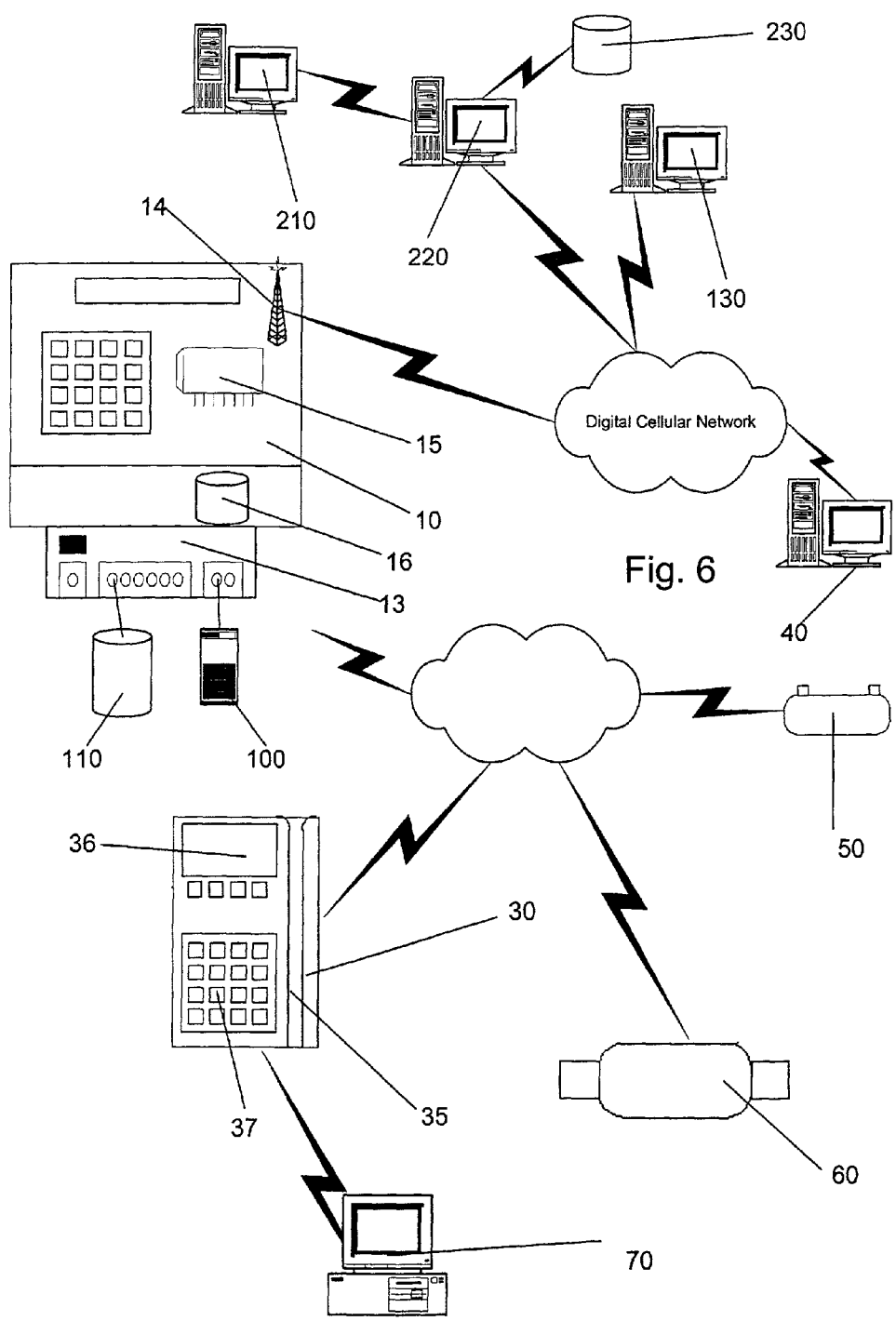
FIG. 6 is the schematic diagram of FIG. 5 incorporating further aspects of the present invention; and, FIG. 7 is a schematic diagram of a system according to another aspect of the present invention.

FIG. 6 is a schematic diagram of the system of FIG. 5 incorporating further aspects of the present invention. Where a utility meter 10 is configured as a pre-pay meter, the location is also provided with an identification card. The identification card carries the unique identification code embedded within the utility meter 10 and allows somebody to credit pre-payments to the meter 10 remotely. On visiting a bank, supermarket or other facility offering pre-payment facilities 210, someone possessing the card can present it along with a pre-payment in order for the meter to be credited. Data from the card is obtained at the pre-payment facilities 210 by reading the card using a card reader. From the data, the unique identification code is obtained and communicated, along with the amount of pre-payment received, to a central communication unit 220.

The communication unit 220 includes a database 230 of the unique identification codes cross-referenced with the digital cellular network number for the transceiver for the meter having that code. The code received from the pre-payment facility is cross-referenced in the database 230 and the digital cellular number is obtained. The communication unit 220 communicates with the meter 10 via the digital cellular network 120 and instructs it to credit the amount pre-paid.

A pre-payment transaction does not have to be done by the occupant of the location and could be performed by other parties, including Government Agencies. The utility meter 10 may be arranged to communicate with a government agency or similar if a suitably programmed pre-payment meter reaches a predetermined level of credit. In this manner, if a family on government funded income support or a similar scheme was in threat of having their gas or electricity cut off due to lack of credit, the government agency is informed and able to authorise an emergency credit or a credit against a future income support payment. Using such a configuration, money intended for energy in a pensioner income support payment would never need be paid to people. Instead, the money can be automatically credited to the relevant utility meter 10 thereby avoiding possible abuse. In addition, the system could be configured such that pre-payment could be made from the home via the user interface unit 30 in the same manner as a regular financial transaction is made.

FIG. 7 is a schematic diagram of a system according to another aspect of the present invention. The utility meter 10 controls a number of switches 13 and is in communication with a communication unit 20. The switches 13 are connected to appliances that consume comparatively high amounts of energy when operating. For example, these may include electric storage heaters 100, hot water storage systems 110 and washing machines 111. The communication unit 20 is configured to be able to send and receive data via communications link 120.

The utility meter operates substantially as has been described with reference to the previous FIGS. 1 to 4.

Based on an agreement with an energy supplier, the utility meter 10 can be configured to automatically operate the appliances 100, 110, 111 during certain periods and cease their operation during other periods. In this way, energy consumption can be substantially controlled by the supplier because the supplier can set the periods during which the high energy consuming devices operate to be the periods in which there is a predicted drop in energy demand. Energy supplied under such an agreement during the predetermined periods would likely to be discounted.

Control of the utility meter is achieved by programming it to call an energy management system 300 at predetermined periods using the communication unit 20. Alternatively, the energy management system 300 may call selected utility meters 10 via the communication unit 20. The energy management system 300 stores messages for the utility meters 10 concerning requested operation periods of the appliances 100, 110, 111. The messages are downloaded and used to control the operation of the appliances using the switches 13. The messages can be generated by energy suppliers based on predicted energy demand. In addition to appliance control messages, messages may also change the frequency in which the utility meter 10 calls the energy management system 300.

To avoid charging the user for this call, a free-phone number may be used. Alternatively, the calling line identifier (CLI) of callers to the energy management system 300 may be determined. Only calls from the CLI is registered to a utility meter 10 having a message waiting in the energy management system 300 may be answered.

A user need not accept the control messages from the energy management system 300. Optionally, approval may need to be sought from the user via the user interface unit 30 to apply control to appliances according to a control message. The control messages could also be overridden at the utility meter 10 or the appliance 100, 110, 111.

The switches 13 may be connected to a separate energy circuit in the location to which only the high energy appliances 100, 110, 111 are connected. Alternatively the switches may be installed at or near the appliances and controlled, for example, using the Pico-network. In such a configuration, the switches would include their own Pico-network communication device.

It is estimated that an array of 20 transponders at an energy management system 300 can process 5,000,000 calls per day. Such a turnover should allow an energy supplier to achieve real time response to energy supply and demand requirements.

Since the utility meter is in a fixed place it provides a unique identification key that "passports" all other intelligent devices within the location. The utility meter can use its unique electronic identity and its "fixed place" location to log the activity of all related Pico-net devices Although various references to digital cellular communication systems have been made, the present invention is applicable to any communication system where two-way point-to-point communication is possible. For example, communication could be made to via the PSTN. Where the communication is made to a link that is not dedicated to the utility meter system, such as where a communication unit shares the main telephone line of a home, the utility meter 10 or communication unit 20 may be arranged to monitor the calling line identifier (CLI) of incoming calls and to intercept those from predetermined numbers such as the energy management system 300 or communication unit 220 before any telephone in the home rings and disturbs the occupants.

Whilst a number of different combinations of features have been described with reference to different embodiments of the present invention, the skilled person will appreciate that all the features described are complementary and could be combined in different combinations to those specifically described without any technical difficulty. Furthermore, whilst the above description has been directed to a utility meter incorporating various features enabling interaction with a user or the outside world, it will be apparent that a suitable add-on unit could be installed within a home or business premises and arranged to communicate with an existing meter. Preferably an add-on unit would be permanently attached to an existing meter to meet the security and authorization requirements detailed above. The reader will appreciate that such an add-on unit falls within the scope of the present invention.

The invention claimed is:

1. A financial transaction authorization system comprising:
   A. a financial institution which processes credit/charge card charge requests,
   B. a utility meter provided at a meter location separate and spaced from the financial institution, the utility meter having an associated meter location identifier unique to the meter location, and
   C. a user interface unit separate and spaced from the financial institution, the user interface unit being adapted to process a submitted credit/charge card charge authorization,
   wherein the utility meter is arranged:
   a. to communicate with the user interface unit,
   b. to obtain the card charge authorization therefrom, and
   c. to transmit a credit/charge card charge request to the financial institution based on the card charge authorization and meter location identifier, the card charge request including:
      (1) data identifying a credit/charge card account, and
      (2) data verifying that the credit/charge card corresponding to the credit/charge card account is physically present at the location of the user interface unit,
      to obtain authorization of the card charge from the financial institution, wherein the financial institution processes the card charge request from the utility meter regardless of whether the card charge request relates to any utility usage measurements made by the utility meter.

2. A financial transaction authorization system according to claim 1, further comprising a communication unit arranged to communicate with the financial institution, wherein the utility meter is arranged to submit the card charge request to the communication unit for communication to the financial institution to obtain authorization of the card charge.

3. A financial transaction authorization system according to claim 2, in which the utility meter is arranged to submit utility usage data to the communication unit.

4. A financial transaction authorization system according to claim 3, in which the communication unit is arranged to communicate utility usage data to a utility supplier.

5. A financial transaction authorization system according to claim 3, in which the communication unit communicates with one or more utility suppliers via a central control system.

6. A financial transaction authorization system according to claim 3, in which the user interface unit includes a keyboard, wherein the user interface unit is arranged to accept data entered via the keyboard to form at least a part of a card charge authorization.

7. A financial transaction authorization system according to claim 3, in which the utility meter includes a memory for storing a user's banking data, wherein the user interface unit is arranged to accept an input from the user authorizing use of at least part of the banking data, the utility meter then using the at least part of the banking data to form at least a part of a card charge authorization.

8. A financial transaction authorization system according to claim 3, in which the user interface unit includes a display, wherein the user interface unit is arranged to display on request utility usage data from the utility meter.

9. A financial transaction authorization system according to claim 3, in which the user interface unit is connectable to a computer, wherein the user interface unit, when connected to a computer, is operative to make necessary card charge authorization requests in response to electronic transactions initiated on the computer.

10. A financial transaction authorization system according to claim 3, in which the user interface device is remote from the utility meter.

11. A financial transaction authorization system according to claim 2, wherein the utility meter provided at the location is a first utility meter, and further comprising a second utility meter provided at the location, wherein said second utility meter is arranged to submit utility usage data to the communication unit.

12. A financial transaction authorization system according to claim 11, in which said second utility meter is arranged to submit the utility usage data to said first utility meter for submission to the communication unit.

13. A financial transaction authorization system according to claim 11, in which said second meter is a gas or water meter.

14. A financial transaction authorization system according to claim 13, in which the further utility meter communicates via RF signals.

15. A financial transaction authorization system according to claim 11, in which the user interface unit and the utility meter communicate with each other via RF signals.

16. A financial transaction authorization system according to claim 11, in which the communication unit and the utility meter communicate with each other via RF signals.

17. A financial transaction authorization system according to claim 11, further comprising a digital cellular transceiver arranged to communicate with the utility meter for transmitting data to, and receiving data, from a remote source.

18. A financial transaction authorization system according to claim 17, in which the transceiver is the communication unit.

19. A financial transaction authorization system according to claim 17, further comprising a switching unit controllable by the utility meter for switching one or more appliances on or off, wherein when the utility meter receives a signal via the transceiver indicating the availability of cheap-rate energy it is arranged to control the switching unit to switch appliances on.

20. A financial transaction authorization system according to claim 2, in which the financial institution comprises a central control system, wherein the central control system processes received card charge requests and submits the requests to appropriate banking authorities for fulfillment.

21. A financial transaction authorization system according to claim 2, in which the communication unit is a modem.

22. A financial transaction authorization system according to claim 2, in which the user interface unit is the communication unit.

23. A financial transaction authorization system according to claim 22, wherein the user interface unit is a telephone.

24. A financial transaction authorization system according to claim 2, in which the user interface unit includes a card reader device, wherein the card reader device is arranged to read data from a credit/charge card to be charged, the user interface unit processing the data read from the credit/charge card to form at least a part of a card charge authorization.

25. A financial transaction authorization system according to claim 1, in which the utility meter is an electricity meter.

26. A financial transaction authorization system according to claim 1, wherein the card charge authorization, card charge request, and corresponding card charge are independent of any utility usage data generated by the utility meter, whereby the card charge does not pay for any utility usage measured by the utility meter.

27. A method of authorizing a card financial transaction comprising the steps of:
 a. providing a user interface unit at a location;
 b. providing a utility meter at the location, the utility meter having an associated meter location identifier uniquely identifying the location;
 c. accepting a card charge authorization request via the user interface unit, the transaction authorization request including:
  (1) data verifying that a credit/charge card is present at the location of the user interface unit, and
  (2) data identifying the credit/charge card account of the credit/charge card;
 d. communicating the card charge authorization request from the user interface unit to the utility meter; and
 e. transmitting a message generated in dependence on the card charge authorization request and meter location identifier from the utility meter to a financial institution to obtain authorization of the card charge, wherein the financial institution processes the message regardless of whether it relates to any utility usage measurements made by the utility meter.

28. The method of claim 27 wherein the card charge authorization request and corresponding card charge are independent of any utility usage data generated by the utility meter, whereby the card charge does not pay for any utility usage measured by the utility meter.

29. A credit/charge card financial transaction authorization system for card charge transactions where the cardholder is at a location remote from the vendor, the system comprising:
 a. a user interface unit capable of accepting card charge data including:
  (1) credit/charge card data identifying a credit/charge card to be charged, and
  (2) data verifying that the credit/charge card is physically present at the user interface unit; and,
 b. a utility meter provided at the location of the cardholder, the utility meter being separate from the user interface unit and having an associated meter location identifier uniquely identifying the location of the utility meter,
 c. a financial institution remote from the user interface unit and utility meter,
 wherein:
  (1) the utility meter is arranged to communicate with the user interface unit, to obtain the card charge data, and to transmit card charge request including the card charge data and the meter location identifier to the financial institution;
  (2) the financial institution is arranged to process the card charge request and, upon successful authorization, charge the credit/charge card as a card present type card charge, regardless of whether the card charge request relates to any utility usage measurements made by the utility meter.

30. The credit/charge card financial transaction authorization system of claim 29 wherein the card charge data are independent of any utility usage data generated by the utility meter, whereby the card charge does not pay for any utility usage measured by the utility meter.

31. A transaction authorization system including:
a. a utility meter provided at a meter location, the utility meter having an associated meter location identifier unique to the meter location,
b. a user interface unit for accepting an authorization for a funds transfer, the user interface unit:
  (1) including a card reader device, the card reader device being arranged to read data from a credit/charge card to be charged for the funds transfer,
  (2) communicating with the utility meter to obtain the location identifier,
  (3) processing the data read from the credit/charge card in combination with the location identifier to form at least a part of the funds transfer authorization to verify that the credit/charge card is physically present at the location of the utility meter,
  wherein the funds transfer authorization is unrelated to any utility usage.

32. A credit/charge card transaction authorization system including:
a. a utility meter:
  (1) situated at a meter location, and
  (2) having an associated meter location identifier which is unique to the meter location;
b. a financial institution arranged to process submitted funds transfer requests for a credit/charge card, the submitted funds transfer requests including:
  (1) card-present funds transfer requests wherein the physical location of the credit/charge card is verified,
  (2) card-not-present funds transfer requests wherein the physical location of the credit/charge card is not verified;
  wherein card-not-present funds transfer requests are processed differently than card-present funds transfer requests;
c. a user interface unit:
  (1) configured to read data from the credit/charge card to be charged for the funds transfer;
  (2) being situated at the meter location, and
  (3) being connected in communication with the utility meter,
wherein one or both of the user interface unit and the utility meter are configured to generate a card-present funds transfer request for submission to the financial institution, the submitted card-present funds transfer request having content encoding:
I. the data read from the credit/charge card to be charged for the funds transfer, and
II. the meter location identifier,
whereby the card-present funds transfer request verifies that the credit/charge card is physically present at the meter location, and
wherein the financial institution processes the submitted card-present funds transfer request regardless of whether the request relates to any utility usage measurements made by the utility meter.

33. A transaction payment method including the steps of:
a. receiving a sales transaction, wherein the sales transaction is unrelated to any utility usage;
b. communicating data on the sales transaction to a user interface unit, the user interface unit:
  (1) being at a meter location,
  (2) being arranged to communicate with a utility meter at the meter location, the utility meter having a meter location identifier uniquely identifying the meter location, and
  (3) having a card reader;
c. receiving, at the card reader, a credit/debit card to be charged for the sales transaction; and
d. communicating a request to charge the credit/debit card for the transaction, the request including data regarding:
  (1) the credit/debit card, and
  (2) the meter location identifier,
  wherein the request is independent of any utility usage data generated by the utility meter.

34. The transaction payment method of claim 33 wherein the sales transaction is received via on-line or telephonic communication.

* * * * *